US012782615B2

(12) United States Patent
Allen et al.

(10) Patent No.: US 12,782,615 B2
(45) Date of Patent: Nov. 3, 2026

(54) PROTECTIVE COATINGS FOR ALUMINUM MIRRORS AND METHODS OF FORMING THE SAME

(71) Applicant: CORNING INCORPORATED, Corning, NY (US)

(72) Inventors: Donald Erwin Allen, Painted Post, NY (US); Narendra Shamkant Borgharkar, Fairport, NY (US); Ming-Huang Huang, Ithaca, NY (US); Hoon Kim, Horseheads, NY (US); Jue Wang, Pittsford, NY (US)

(73) Assignee: CORNING INCORPORATED, Corning, NY (US)

(*) Notice: Subject to any disclaimer, the term of this patent is extended or adjusted under 35 U.S.C. 154(b) by 598 days.

(21) Appl. No.: 17/994,457

(22) Filed: Nov. 28, 2022

(65) Prior Publication Data

US 2023/0168417 A1 Jun. 1, 2023

Related U.S. Application Data

(60) Provisional application No. 63/284,293, filed on Nov. 30, 2021.

(51) Int. Cl.
*G02B 5/08* (2006.01)
*B32B 15/20* (2006.01)
(Continued)

(52) U.S. Cl.
CPC ............ *G02B 5/0833* (2013.01); *B32B 15/20* (2013.01); *B32B 17/061* (2013.01); *G02B 1/115* (2013.01);
(Continued)

(58) Field of Classification Search
CPC ....... G02B 5/0833; G02B 1/115; B32B 15/20; B32B 17/061; B32B 2250/04;
(Continued)

(56) References Cited

U.S. PATENT DOCUMENTS

| | | | |
|---|---|---|---|
| 6,531,074 | B2 | 3/2003 | Trumble et al. |
| 7,535,176 | B2 | 5/2009 | Marking et al. |

(Continued)

FOREIGN PATENT DOCUMENTS

| | | | |
|---|---|---|---|
| CA | 2330941 | A1 | 7/2001 |
| CN | 100583352 | C | 1/2010 |

(Continued)

OTHER PUBLICATIONS

"Enhanced atomic layer etching of native aluminum oxide for ultraviolet optical applications", J. Hennessy et al, Journal of Vacuum Science & Technology A 35, 041512 (2017) (Year: 2017).*

(Continued)

*Primary Examiner* — William R Alexander
*Assistant Examiner* — Alaina Marie Swanson
(74) *Attorney, Agent, or Firm* — Yiqun Zhao; Ye Eun Park

(57) ABSTRACT

According to at least one feature of the present disclosure, a method of forming an optical element, includes: Depositing an aluminum layer atop a glass substrate via a physical deposition process; depositing a first fluorine containing layer atop the aluminum layer via a physical deposition process; depositing a second fluorine containing layer atop the first fluorine containing layer via a physical deposition process; and depositing a third fluorine containing layer atop the first fluorine containing layer via an atomic layer deposition process.

21 Claims, 1 Drawing Sheet

(51) Int. Cl.
*B32B 17/06* (2006.01)
*G02B 1/115* (2015.01)

(52) U.S. Cl.
CPC ....... *B32B 2250/04* (2013.01); *B32B 2311/24* (2013.01); *B32B 2551/08* (2013.01)

(58) Field of Classification Search
CPC ............. B32B 2311/24; B32B 2551/08; C23C 16/0245; C23C 16/30; C23C 28/30; C23C 28/322; C23C 14/0694; C23C 14/18; C23C 28/40; C23C 28/42; C23C 16/45553; C03C 2218/33; C03C 17/3615; C03C 17/3621; C03C 17/3649; C03C 17/3663
USPC .......................................................... 359/587
See application file for complete search history.

(56) References Cited

U.S. PATENT DOCUMENTS

| | | | |
|---|---|---|---|
| 10,642,167 | B2 | 5/2020 | Shklover et al. |
| 11,520,087 | B2 | 12/2022 | Forcht et al. |
| 11,525,946 | B2 | 12/2022 | Shklover |
| 2001/0048966 | A1 | 12/2001 | Trumble et al. |
| 2002/0158234 | A1 | 10/2002 | Suzuki |
| 2006/0170890 | A1 | 8/2006 | Ito |
| 2007/0024174 | A1 | 2/2007 | Kim et al. |
| 2007/0069623 | A1 | 3/2007 | Marking et al. |
| 2007/0160753 | A1 | 7/2007 | Fan et al. |
| 2009/0141358 | A1 | 6/2009 | Cangemi et al. |
| 2014/0333203 | A1 | 11/2014 | Greuel et al. |
| 2017/0031067 | A1 | 2/2017 | Quijada et al. |
| 2017/0278694 | A1 | 9/2017 | Chuang et al. |
| 2021/0132269 | A1* | 5/2021 | Forcht .................. G02B 5/0858 |
| 2021/0293998 | A1* | 9/2021 | Shklover ............. G03F 7/70958 |
| 2022/0205900 | A1 | 6/2022 | Nikipelov et al. |
| 2022/0373723 | A1 | 11/2022 | Forcht et al. |
| 2023/0147463 | A1 | 5/2023 | Lange et al. |
| 2024/0353315 | A1 | 10/2024 | Nikipelov et al. |

FOREIGN PATENT DOCUMENTS

| | | | |
|---|---|---|---|
| CN | 104024378 | A | 9/2014 |
| CN | 113167942 | A | 7/2021 |
| CN | 116685878 | A | 9/2023 |
| DE | 102018221188 | A1 | 6/2020 |
| DE | 102018221191 | A1 | 6/2020 |
| DE | 102019219177 | A1 | 6/2021 |
| DE | 102020208044 | A1 | 12/2021 |
| DE | 102022210514 | A1 | 4/2024 |
| EP | 1631696 | A4 | 10/2008 |
| EP | 1634314 | B1 | 7/2010 |
| EP | 2751222 | A1 | 7/2014 |
| EP | 4172695 | A1 | 5/2023 |
| JP | 2007-500774 | A | 1/2007 |
| JP | 2007-504348 | A | 3/2007 |
| JP | 4523003 | B2 | 8/2010 |
| JP | 2015-507318 | A | 3/2015 |
| JP | 2022-510701 | A | 1/2022 |
| JP | 2022-515334 | A | 2/2022 |
| JP | 2023-505682 | A | 2/2023 |
| JP | 2023-531547 | A | 7/2023 |
| KR | 10-2002-0070778 | A | 9/2002 |
| KR | 10-2006-0019534 | A | 3/2006 |
| KR | 10-2006-0021308 | A | 3/2006 |
| KR | 10-2007-0014641 | A | 2/2007 |
| KR | 10-0740121 | B1 | 7/2007 |
| KR | 10-1008759 | B1 | 1/2011 |
| KR | 10-2022-0111321 | A | 8/2022 |
| KR | 10-2023-0029878 | A | 3/2023 |
| KR | 10-2023-0121844 | A | 8/2023 |
| RU | 2014128606 | A | 2/2016 |
| WO | 2004/104131 | A2 | 12/2004 |
| WO | 2004/105070 | A2 | 12/2004 |
| WO | 2006/000445 | A1 | 1/2006 |
| WO | 2013/088300 | A1 | 6/2013 |
| WO | 2020/011853 | A1 | 1/2020 |
| WO | 2020/115086 | A2 | 6/2020 |
| WO | 2020/115109 | A1 | 6/2020 |
| WO | 2021/115733 | A1 | 6/2021 |
| WO | 2022/002524 | A1 | 1/2022 |
| WO | 2022/144179 | A1 | 7/2022 |
| WO | 2024/074441 | A1 | 4/2024 |

OTHER PUBLICATIONS

John Hennessy et al., "Atomic layer deposition of magnesium fluoride via bis(ethylcyclopentadienyl)magnesium and anhydrous hydrogen fluoride", Journal of Vacuum Science & Technology, A 33, 01A125 (2015).

John Hennessy et al., "Performance and prospects of far ultraviolet aluminum mirrors protected by atomic layer deposition," JATIS, vol. 2, No. 4, 041206, 2016, pp. 1-11.

Manuel Quijada et al., "Enhanced Far-Ultraviolet Reflectance of MgF2 and LiF Over-coated Al Mirrors", Proc. of SPIE, vol. 91444G, 2014, pp. 1-10.

Brian Fleming et al., "Advanced Environmentally Resistant Lithium Fluoride Mirror Coatings for the Next-Generation of Broadband Space Observatories", arxiv.org, Cornell University Library, 201 Olin Library Cornell University Ithaca, NY 14853, Jan. 9, 2018, pp. 1-10.

Egan Arika et al., "The development and characterization of advanced broadband mirror coatings for the far-UV", Proceedings Of SPIE, vol. 10397, Aug. 2017, pp. 1039715-1039715.

Hennessy John et al., "Atomic Layer Deposition And Etching Methods For Far Ultraviolet Aluminum Mirrors", Proceedings Of SPIE, vol. 10401, Sep. 2017, pp. 1040119-1040119.

International Search Report and Written Opinion of the International Searching Authority; PCT/US2022/050688; mailed on Apr. 11, 2023, 14 pages; European Patent Office.

Endriz et al., "Study of aluminum films. I. optical studies of reflectance drops and surface oscillations on controller-roughness films", Physical Review B, 4, 1971, pp. 4144-4159.

Larruquert et al., "Far-UV reflectance of UHV-prepared Al films and its degradation after exposure to O2", Appl. Optics, 33, 1994, pp. 3518-3522.

Wilbrandt et al., "Protected and enhanced aluminum mirrors for the VUV", Appl. Optics, 53, 2014, pp. A125-A130.

International Search Report and Written Opinion of the International Searching Authority; PCT/US2025/029235; dated Sep. 18, 2025; 11 pages; European Patent Office.

* cited by examiner

PROTECTIVE COATINGS FOR ALUMINUM MIRRORS AND METHODS OF FORMING THE SAME

CROSS REFERENCE TO RELATED APPLICATION

This application claims the benefit of priority under 35 U.S.C. § 119 of U.S. Provisional Application Ser. No. 63/284,293 filed on Nov. 30, 2021, the content of which is relied upon and incorporated herein by reference in its entirety.

FIELD OF THE DISCLOSURE

The present disclosure generally relates to optical elements, and more specifically, to protective coatings for aluminum mirrors.

BACKGROUND

Advanced lithography technology enables smaller feature size of microelectronics. This technology advancement also demands sensitive optical inspection that allows defect detection down to a nanoscale. Currently, defect inspection is dominated by deep-ultraviolet (DUV) optics (i.e. at 193.4 nm). The next generation of optical inspection optics will be dominated by both vacuum ultraviolet (VUV) optics (i.e. at 120 nm-190 nm) and extreme ultraviolet (EUV) optics (i.e. at 13.5 nm). Although the EUV wavelength is 10× shorter than the VUV, many defects are optically more sensitive to the VUV and the EUV. As a result, both VUV and EUV inspection optics are critical for the semiconductor industry. The VUV inspection performance depends on VUV mirrors. Aluminum is recognized as the material of choice for the VUV reflective optics. Factors that affect the performance of current VUV mirrors include Thermal-driven wavefront error of the VUV mirrors, High reflectance of the VUV mirrors, and degradation of the VUV mirrors Accordingly, new protective coatings for aluminum mirrors and methods of making the same may be advantageous.

SUMMARY OF THE DISCLOSURE

According to a first embodiment of the present disclosure, a method of forming an optical element, includes: depositing an aluminum layer atop a glass substrate via a physical deposition process; depositing a first fluorine containing layer atop the aluminum layer via a physical deposition process; depositing a second fluorine containing layer atop the first fluorine containing layer via a physical deposition process; and depositing a third fluorine containing layer atop the first fluorine containing layer via an atomic layer deposition process.

A second embodiment of the of the present disclosure includes the first embodiment, wherein the first fluorine containing layer is one of aluminum fluoride ($AlF_3$) or magnesium fluoride ($MgF_2$).

A third embodiment of the of the present disclosure includes the first embodiment, wherein the second fluorine containing layer is one of aluminum fluoride ($AlF_3$) or magnesium fluoride ($MgF_2$).

A fourth embodiment of the of the present disclosure includes the first embodiment, herein the third fluorine containing layer is one of aluminum fluoride ($AlF_3$) or magnesium fluoride ($MgF_2$).

A fifth embodiment of the of the present disclosure includes the first embodiment, herein the third fluorine containing layer is a stack of alternating layers of aluminum fluoride ($AlF_3$) and magnesium fluoride ($MgF_2$).

A sixth embodiment of the of the present disclosure includes the fifth embodiment, wherein the final layer in the stack of alternating layers is aluminum fluoride ($AlF_3$).

A seventh embodiment of the of the present disclosure includes the fifth embodiment, wherein the final layer in the stack of alternating layers is magnesium fluoride ($MgF_2$).

According to an eighth embodiment of the present disclosure, a method of forming an optical element, includes: depositing an aluminum layer atop a glass substrate via a physical deposition process; removing aluminum oxide ($Al_2O_3$) from a surface of the aluminum layer via an atomic layer etching process; depositing a first fluorine containing layer atop the aluminum layer via an atomic layer deposition process without exposing the glass substrate to atmospheric air after etching the aluminum layer; depositing a second fluorine containing layer atop the first fluorine containing layer via an atomic layer deposition process; and depositing a third fluorine containing layer atop the first fluorine containing layer via an atomic layer deposition process.

A ninth embodiment of the of the present disclosure includes the eighth embodiment, wherein the first fluorine containing layer is one of aluminum fluoride ($AlF_3$) or magnesium fluoride ($MgF_2$).

A tenth embodiment of the of the present disclosure includes the eighth embodiment, wherein the second fluorine containing layer is one of aluminum fluoride ($AlF_3$) or magnesium fluoride ($MgF_2$).

A eleventh embodiment of the of the present disclosure includes the eighth embodiment, wherein the third fluorine containing layer is one of aluminum fluoride ($AlF_3$) or magnesium fluoride ($MgF_2$).

A twelfth embodiment of the of the present disclosure includes the eighth embodiment, wherein the third fluorine containing layer is a stack of alternating layers of aluminum fluoride ($AlF_3$) and magnesium fluoride ($MgF_2$).

A thirteenth embodiment of the of the present disclosure includes the twelfth embodiment, wherein the final layer in the stack of alternating layers is aluminum fluoride ($AlF_3$).

A fourteenth embodiment of the of the present disclosure includes the twelfth embodiment, wherein the final layer in the stack of alternating layers is magnesium fluoride ($MgF_2$).

According to a fifteenth embodiment of the present disclosure, an optical element includes: a glass substrate; an aluminum layer atop the glass substrate; a first fluorine containing layer atop the aluminum layer; a second fluorine containing layer atop the first fluorine containing layer; and a third fluorine containing layer atop the first fluorine containing layer.

A sixteenth embodiment of the of the present disclosure includes the fifteenth embodiment, wherein the first fluorine containing layer is one of aluminum fluoride ($AlF_3$) or magnesium fluoride ($MgF_2$).

A seventeenth embodiment of the of the present disclosure includes the fifteenth embodiment, wherein the second fluorine containing layer is one of aluminum fluoride ($AlF_3$) or magnesium fluoride ($MgF_2$).

An eighteenth embodiment of the of the present disclosure includes the fifteenth embodiment, wherein the third fluorine containing layer is one of aluminum fluoride ($AlF_3$) or magnesium fluoride ($MgF_2$).

A nineteenth embodiment of the of the present disclosure includes the fifteenth embodiment, wherein the third fluorine containing layer is a stack of alternating layers of aluminum fluoride ($AlF_3$) and magnesium fluoride ($MgF_2$).

A twentieth embodiment of the of the present disclosure includes the nineteenth embodiment, wherein the final layer in the stack of alternating layers is aluminum fluoride ($AlF_3$).

A twenty-first embodiment of the of the present disclosure includes the nineteenth embodiment, wherein the final layer in the stack of alternating layers is magnesium fluoride ($MgF_2$).

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
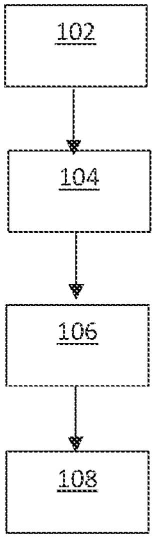
FIG. 1 is a flowchart of an exemplary method of forming an optical element, according to embodiments of the current disclosure.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2:
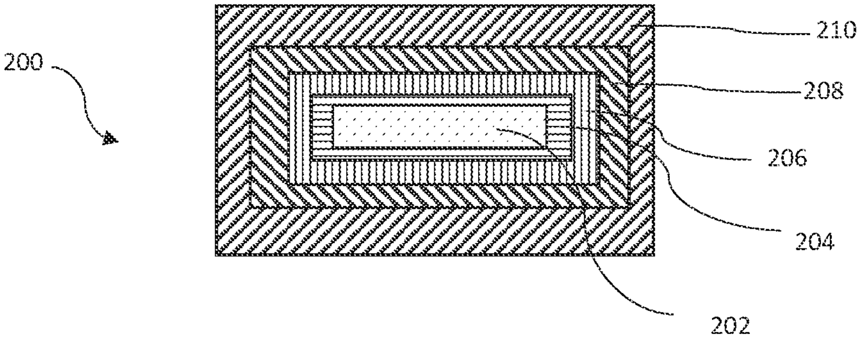
FIG. 2 is an exemplary optical element, according to embodiments of the current disclosure.

FIG. 1A depicts a flow chart of a method 100 of forming an optical element, such as an exemplary optical element 200 depicted in FIG. 2. The method 100 begins at 102 by depositing an aluminum layer 204 atop a glass substrate 202. In embodiments, the glass substrate 202 is a ULE glass available from Corning Incorporated. The aluminum layer 204 is deposited atop the glass substrate 202 via a physical vapor deposition process. In embodiments, the thickness of the aluminum layer 204 is about 100 nm. The thickness of the aluminum layer 204 and the subsequent other layers described herein can vary depending on the specifications required of the final optical element. Next, at 104, a first fluorine containing layer 206 is deposited atop the aluminum layer 204 via a physical deposition process. In embodiments, the first fluorine containing layer 206 is one of aluminum fluoride ($AlF_3$) or magnesium fluoride ($MgF_2$). In embodiments the first fluorine containing layer 206 has a thickness of about 5 nm. Next, at 106, a second fluorine containing layer 208 is deposited atop the first fluorine containing layer 206 via a physical deposition process. In embodiments, the second fluorine containing layer 208 is one of aluminum fluoride ($AlF_3$) or magnesium fluoride ($MgF_2$). In embodiments the second fluorine containing layer 208 has a thickness of about 10 nm. Next, at 108, a third fluorine containing layer 210 is deposited atop the second fluorine containing layer 208 via an atomic layer deposition process. In embodiments, the third fluorine containing layer 210 is one of aluminum fluoride ($AlF_3$) or magnesium fluoride ($MgF_2$). In embodiments, the third fluorine containing layer 210 is a stack of alternating layers of aluminum fluoride ($AlF_3$) and magnesium fluoride ($MgF_2$). In embodiments, the final layer in the stack of alternating layers is aluminum fluoride ($AlF_3$). In embodiments, the final layer in the stack of alternating layers is magnesium fluoride ($MgF_2$). The third fluorine containing layer 210 provides protection from oxidation of the aluminum layer 204 due to pinhole free film formation. Table 1 below presents exemplary embodiments of suitable optical elements formed via the method described herein.

($Al_2O_3$) is exposed to a remote plasma of Ar/$SF_6$ for about 1 second to 10 seconds and then exposed to TMA for greater than 100 milliseconds. The exposure time can be adjusted based on the volume of the reactor.

In embodiments, suitable aluminum precursors used for atomic layer deposition of the aluminum layer include: trimethylaluminum (TMA), triethylaluminum (TEA) or Dimethylaluminum isopropoxide (DMAI), or [MeC(NiPr) 2]AlEt2, or Dimethylaluminumhydride:Dimethylethylamine, or Ethylpiperidine:Dimethylaluminumhydride. In embodiments, suitable fluorine sources used for deposition of fluorine containing layers include: hydrogen fluoride (HF), and plasma with a mixture of sulfur hexafluoride ($SF_6$) and argon or a mixture of nitrogen trifluoride ($NF_3$) and argon, or $SF_6$, $NF_3$, or $CF_4$. In embodiments, suitable Mg precursors include: Bis(ethylcyclopentadienyl)magnesium, MgCp2, Mg(thd)2; Bis(2,2,6,6-tetramethyl-3,5-heptanedionato) magnesium, Bis(N,N'-di-sec-butylacetamidinato) magnesium, Bis(pentamethylcyclopentadienyl) magnesium.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

TABLE 1

| | Ex. A | Ex. B | Ex. C | Ex. D |
|---|---|---|---|---|
| Substrate | ULE | ULE | ULE | ULE |
| PVD-Metal Layer | 100 nm PVD-Al | 100 nm PVD-Al | 100 nm PVD-Al | 100 nm PVD-Al |
| 1st Fluorine Containing Layer (PVD) | 5 nm PVD-AlF3 | 5 nm PVD-MgF2 | 5 nm PVD-MgF2 | 5 nm PVD-AlF3 |
| 2nd Fluorine Containing Layer (PVD) | 10 nm PVD-AlF3 | 10 nm PVD-MgF2 | 10 nm PVD-MgF2 | 10 nm PVD-AF3 |
| 3rd Fluorine Containing Layer (Final ALD Sealing) | 10 nm ALD-MgF2 | 10 nm ALD-MgF2 | Layer Stack of 2.5 nm ALD-AlF3, followed by 2.5 nm ALD-MgF2 (Repeat twice) | Layer Stack of 2.5 nm ALD-AlF3, followed by 2.5 nm ALD-MgF2 (Repeat twice) |

| | Ex. E | Ex. F | Ex. G | Ex. H |
|---|---|---|---|---|
| Substrate | ULE | ULE | ULE | ULE |
| PVD-Metal Layer | 100 nm PVD-Al | 100 nm PVD-Al | 100 nm PVD-Al | 100 nm PVD-Al |
| 1st Fluorine Containing Layer (PVD) | 5 nm PVD-AlF3 | 5 nm PVD-MgF2 | 5 nm PVD-AlF3 | 5 nm PVD-MgF2 |
| 2nd Fluorine Containing Layer (PVD) | 10 nm PVD-AlF3 | 10 nm PVD-MgF2 | 10 nm PVD-AlF3 | 10 nm PVD-MgF2 |
| 3rd Fluorine Containing Layer (Final ALD Sealing) | Layer Stack of 2.5 nm ALD-AlF3 followed by 2.5 nm ALD-MgF2 followed by 5 nm MgF2 | Layer Stack of 2.5nm ALD-AlF3 followed by 2.5 nm ALD-MgF2 followed by 5 nm MgF2 | Layer Stack of 5 nm ALD -AlF3 followed by 5 nm ALD MgF2 | Layer Stack of 5 nm ALD-AlF3 followed by 5 nm ALD MgF2 |

In embodiments, after depositing the aluminum layer 204 at step 104, a native aluminum oxide ($Al_2O_3$) layer may form on the aluminum layer 204. The aluminum oxide ($Al_2O_3$) is removed from a surface of the aluminum layer 204 via an atomic layer etching process. In an exemplary atomic layer etching process, the aluminum oxide ($Al_2O_3$) is removed via sequential exposure of Trimethylaluminum (TMA) and hydrogen fluoride (HF), or other fluorine containing compound such as $SF_6$, at a temperature of about 225° C. to 325° C. In embodiments, aluminum oxide It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below,

What is claimed is:

1. A method of forming an optical element, the method comprising:

depositing an aluminum layer atop a glass substrate via a first physical deposition process and depositing a protective coating on a side of the aluminum layer opposite the glass substrate, wherein depositing the protective coating comprises:

depositing a first fluorine containing layer atop the aluminum layer via a second physical deposition process;

depositing a second fluorine containing layer atop the first fluorine containing layer via a third physical deposition process; and depositing a third fluorine containing layer directly onto the second fluorine containing layer via an atomic layer deposition process, wherein the third fluorine containing layer is an outermost layer of the optical element, wherein the optical element does not have an oxide layer.

2. The method of claim 1, wherein the first fluorine containing layer is one of aluminum fluoride ($AlF_3$) or magnesium fluoride ($MgF_2$) or the second fluorine containing layer is one of aluminum fluoride ($AlF_3$) or magnesium fluoride ($MgF_2$).

3. The method of claim 1, wherein the third fluorine containing layer is one of aluminum fluoride ($AlF_3$) or magnesium fluoride ($MgF_2$).

4. The method of claim 1, wherein the third fluorine containing layer is a stack of alternating layers of aluminum fluoride ($AlF_3$) and magnesium fluoride ($MgF_2$).

5. The method of claim 4, wherein a final layer in the stack of alternating layers is aluminum fluoride ($AlF_3$).

6. The method of claim 4, wherein a final layer in the stack of alternating layers is magnesium fluoride ($MgF_2$).

7. A method of forming an optical element, the method comprising:

depositing an aluminum layer atop a glass substrate via a physical deposition process, wherein an aluminum oxide ($Al_2O_3$) layer forms on a surface of the aluminum layer after the depositing the aluminum layer;

removing the aluminum oxide ($Al_2O_3$) layer from the surface of the aluminum layer via an atomic layer etching process;

depositing a first fluorine containing layer atop the aluminum layer via a first atomic layer deposition process without exposing the glass substrate and aluminum layer to atmospheric air after removing the aluminum oxide layer;

depositing a second fluorine containing layer atop the first fluorine containing layer via a second atomic layer deposition process; and depositing a third fluorine containing layer directly onto the second fluorine containing layer via a third atomic layer deposition process, wherein the third fluorine containing layer is an outermost layer of the optical element and the optical element does not have an oxide layer.

8. The method of claim 7, wherein the first fluorine containing layer is one of aluminum fluoride ($AlF_3$) or magnesium fluoride ($MgF_2$).

9. The method of claim 7, wherein the second fluorine containing layer is one of aluminum fluoride ($AlF_3$) or magnesium fluoride ($MgF_2$).

10. The method of claim 7, wherein the third fluorine containing layer is one of aluminum fluoride ($AlF_3$) or magnesium fluoride ($MgF_2$).

11. The method of claim 7, wherein the third fluorine containing layer is a stack of alternating layers of aluminum fluoride ($AlF_3$) and magnesium fluoride ($MgF_2$).

12. The method of claim 11, wherein a final layer in the stack of alternating layers is aluminum fluoride ($AlF_3$).

13. The method of claim 11, wherein a final layer in the stack of alternating layers is magnesium fluoride ($MgF_2$).

14. An optical element comprising:

a glass substrate;

an aluminum layer atop the glass substrate; and a protective coating disposed on a side of the aluminum layer opposite the glass substrate, wherein the protective coating comprises:

a first fluorine containing layer;

a second fluorine containing layer atop the first fluorine containing layer; and a third fluorine containing layer atop the second fluorine containing layer, wherein the third fluorine containing layer is an outermost layer of the optical element and the optical element does not have an oxide layer.

15. The optical element of claim 14, wherein the first fluorine containing layer is one of aluminum fluoride ($AlF_3$) or magnesium fluoride ($MgF_2$).

16. The optical element of claim 14, wherein the second fluorine containing layer is one of aluminum fluoride ($AlF_3$) or magnesium fluoride ($MgF_2$).

17. The optical element of claim 14, wherein the third fluorine containing layer is one of aluminum fluoride ($AlF_3$) or magnesium fluoride ($MgF_2$).

18. The optical element of claim 14, wherein the third fluorine containing layer is the stack of alternating layers of aluminum fluoride ($AlF_3$) and magnesium fluoride ($MgF_2$).

19. The optical element of claim 18, wherein a final layer in the stack of alternating layers is aluminum fluoride ($AlF_3$).

20. The optical element of claim 18, wherein a final layer in the stack of alternating layers is magnesium fluoride ($MgF_2$).

21. The optical element of claim 14, wherein the first fluorine containing layer, the second fluorine containing layer, and the third fluorine containing layer each have a thickness less than or equal to 10 nm.

* * * * *